United States Patent [19]
Olson et al.

[11] Patent Number: 5,415,446
[45] Date of Patent: May 16, 1995

[54] SAFETY APPARATUS AND METHOD FOR USING THE SAME

[75] Inventors: Wayne L. Olson, Central Point, Oreg.; Gary E. Choate, Lakewood, Colo.

[73] Assignee: Rose Systems, Inc., Englewood, Colo.

[21] Appl. No.: 17,819

[22] Filed: Feb. 16, 1993

Related U.S. Application Data

[63] Continuation-in-part of Ser. No. 834,866, Feb. 13, 1992, abandoned.

[51] Int. Cl.⁶ .................................................. B25J 1/00
[52] U.S. Cl. ................................. 294/19.1; 294/82.24
[58] Field of Search .......................... 294/19.1, 22–24, 294/82.24, 82.27, 99.1

[56] References Cited

U.S. PATENT DOCUMENTS

| | | | |
|---|---|---|---|
| 2,979,013 | 4/1961 | Whittall | 294/19.1 |
| 3,327,376 | 6/1967 | Freeman et al. | 294/19.1 X |
| 3,913,515 | 10/1975 | Hernsjö et al. | 294/19.1 |
| 4,359,240 | 11/1982 | Woeber | 294/19.1 X |
| 4,932,700 | 6/1990 | Hart | 294/19.1 |
| 5,003,848 | 4/1991 | Ceccucci, Jr. | 294/19.1 X |

Primary Examiner—Dean J. Kramer
Attorney, Agent, or Firm—Klaas, Law, O'Meara & Malkin; Joseph J. Kelly

[57] ABSTRACT

Apparatus and method for securing an anchor strap in a relatively fixed position at a location which is spaced a substantial distance from a fixed surface wherein the anchor strap has a relatively flexible intermediate portion, a relatively rigid one end portion having an anchor ring secured thereto and a closed loop at the other end portion and wherein an operating tool mounted on the end of an extensible handle is used to pass the relatively rigid one end portion over a fixed support and then pull the relatively rigid one end portion through the closed loop to secure the anchor strap on the fixed support and wherein another operating tool mounted on the end of the extensible handle is used to connect or disconnect a snap hook, having a lifeline attached thereto, to or from the anchor ring. In another embodiment, a portion of the relatively flexible intermediate portion extending from the relatively rigid one end portion is provided with stitching to add rigidity thereto. Also, a reinforcing member is secured to the inner surface of the closed loop so that when a portion of the closed loop is turned inside out it will be held in an open configuration. In another embodiment, the closed loop has a twist therein. Also, the operating tool has a releasable retaining portion for releasably retaining a portion of the relatively flexible intermediate portion for use in removing the anchor strap from the fixed support.

11 Claims, 7 Drawing Sheets

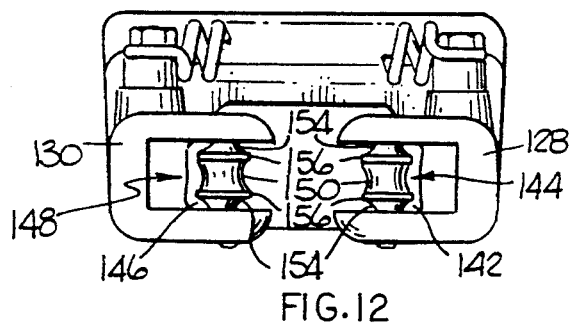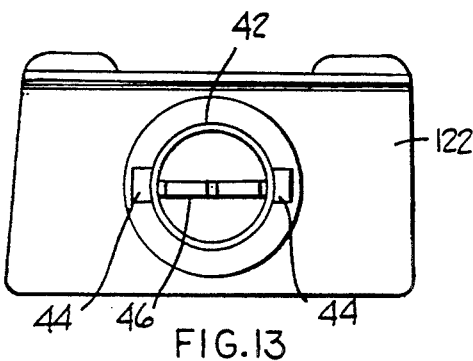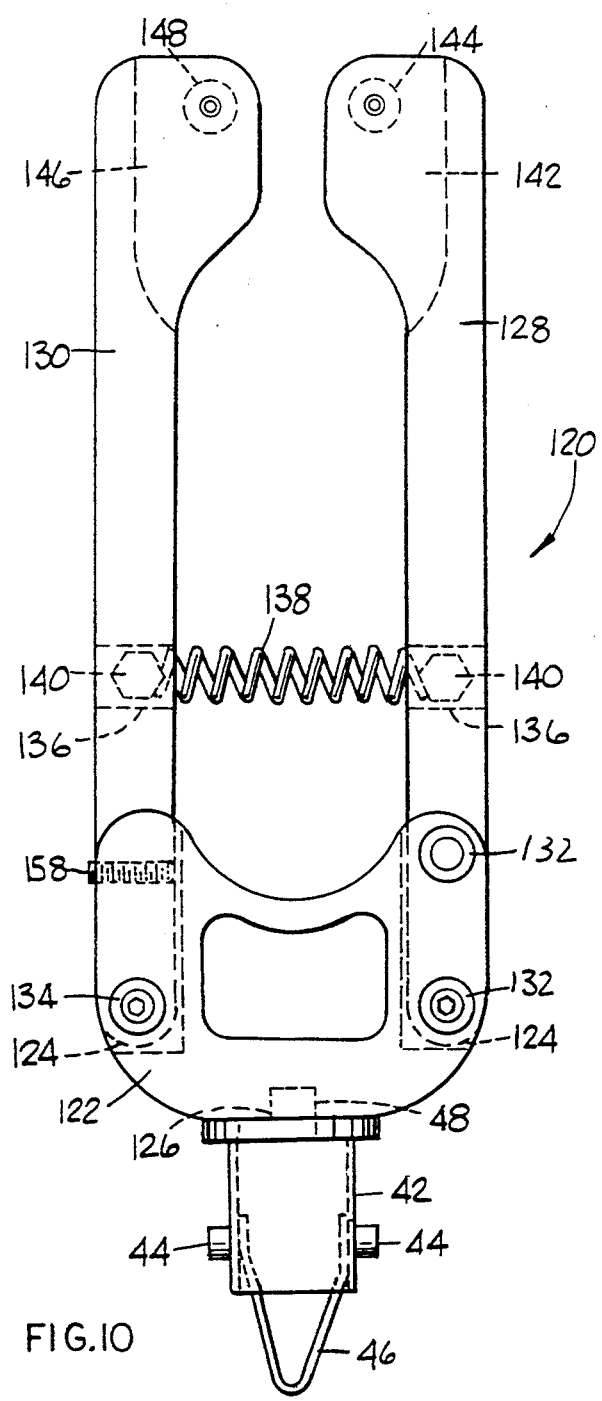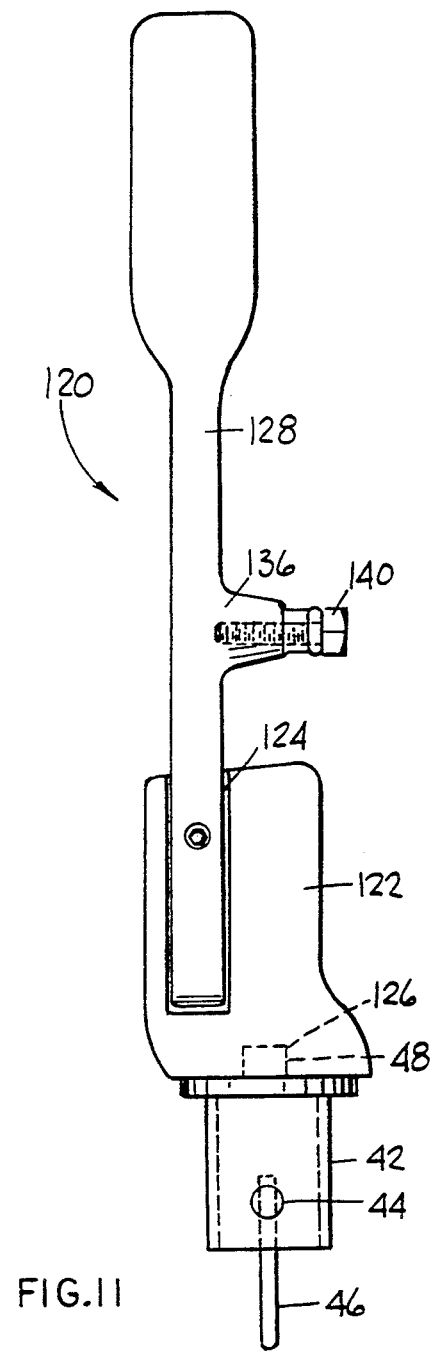

SAFETY APPARATUS AND METHOD FOR USING THE SAME

This application is a continuation-in-part of U.S. patent application Ser. No. 834,866 filed Feb. 13, 1992 for Safety Apparatus And Method For Using The Same, now abandoned.

FIELD OF THE INVENTION

This invention relates generally to safety apparatus used to protect personnel in the event of an accidental fall when such personnel are working at a precariously high position, such as upon a ladder, and more particularly for securing a safety strap on a fixed support located at a distance remote from a fixed surface and for connecting or disconnecting safety apparatus on the safety strap.

BACKGROUND OF THE INVENTION

There are many types of safety apparatus for protecting working personnel in the event of an accidental fall when such personnel are working at a precarious high position. In many instances, it is not possible to provide safety apparatus prior to exposing working personnel to precarious high positions. This occurs when it is desired to work at a high position and it is necessary to support safety apparatus at a location that is remote, at least about ten feet from a fixed surface. Safety regulations are directed to the protection of working personnel when performing work at a location more than ten feet from a relatively fixed surface. In these situations, working personnel must climb a ladder and carry apparatus such as an anchor strap having an anchor ring for supporting safety apparatus. For such an installation, it is not unusual that the first man up must be exposed to a fall hazard with no protecting apparatus in place. Therefore, it is desirable to be able to secure safety apparatus on a fixed support located at a remote distance from a fixed surface without exposing working personnel to danger of injury from an accidental fall.

BRIEF DESCRIPTION OF THE INVENTION

This invention provides apparatus and method for securing or removing an anchor strap on or from a fixed support located at a distance remote from a fixed surface and apparatus for connecting or disconnecting safety apparatus to the anchor strap.

In a preferred embodiment of the invention, the anchor strap comprises a relatively flexible intermediate portion comprising one ply of a webbing material; a relatively rigid one end portion comprising two plies of the webbing material stitched together so that it is capable of remaining substantially in a horizontal plane when mounted in a cantilever fashion and a closed loop at the other end portion, which closed loop is formed from one ply of the webbing material. The relatively rigid one end portion has a length that is substantially greater than its width. A portion of the relatively flexible intermediate portion extending from the relatively rigid one end portion is provided with lengthwise-extending stitching to provide some rigidity thereto. An anchor ring is mounted in an eye portion formed by the folding of the two plies and the stitching so that the anchor ring will remain substantially in the same plane as the relatively rigid one end portion when in the horizontal plane. In another preferred embodiment of the invention, a reinforcing member is secured to the inner surface of the closed loop so that a portion of the closed loop can be turned inside out to provide sufficient rigidity to retain the closed loop in an opened configuration. In still another preferred embodiment, a twist is put in a portion of loop prior to securing the end of the webbing to the relatively flexible intermediate portion to form a closed loop having a twist to provide sufficient rigidity to retain the closed loop in an opened configuration.

The apparatus, for use in securing the anchor strap to a fixed support located at a distance remote from a fixed surface, comprises an extensible handle which may be locked at any desired extended position and an operating portion connected to the end of the extensible handle by a quick disconnecting device. The operating tool has retaining means for releasably retaining at least a portion of the relatively rigid one end portion which retaining means comprise an open-ended slot having at least a portion thereof which is smaller than the thickness of the relatively rigid one end portion. The operating means also have engaging means for engaging at least a portion of the anchor ring so that a force may be applied thereto which engaging means preferably comprise at least one hook portion.

In using the apparatus to secure the anchor strap on a relatively fixed support, such as an I-beam in a building and which I-beam has an upper surface, the operating portion is passed through the closed loop and a portion of the relatively rigid one end portion is releasably secured in the open-ended slot. The handle is extended until the relatively rigid one end portion is at a location above the upper surface and is then moved over the upper surface so that the anchor ring is spaced from one side of the upper surface and the relatively flexible intermediate portion is spaced from the other side of the upper surface. The relatively rigid one end portion is moved against the upper surface to remove the relatively rigid one end portion out of the open-ended slot which relatively rigid one end portion is then supported on the upper surface. The operating portion is then moved to place the hook portion into the anchor ring so that the anchor ring, the relatively rigid one end portion and a portion of the relatively flexible intermediate portion may be pulled through the closed loop until the anchor strap is secured on the I-beam.

The apparatus, for use in connecting a snap hook, which is a portion of the safety apparatus, to the anchor ring comprises an operating portion that is connected to the extensible handle using a quick disconnecting device. The operating portion has opening means for opening the snap hook, which is normally urged into a closed position and releasably locked therein, as the snap hook is moved through the opening means and retaining means for retaining the snap hook in the opened position. In one preferred embodiment of the invention, the operating portion comprises a base member having at least a pair of spaced apart lever arms projecting outwardly therefrom. At least one of the at least a pair of spaced apart lever arms is pivotally mounted on the block member. Resilient means are provided for urging the lever arms toward each other and stop means are provided for limiting the movement of the at least a pair of lever arms toward each other. Contacting means are provided on each of the at least a pair of lever arms for contacting portions of the snap hook as the snap hook is passed between the contacting means. The contacting means preferably comprise rollers rotatably mounted in recess portions of the lever arms.

In using the apparatus for connecting a snap hook to the anchor ring, the extensible handle is in the nonextended position. A snap hook, of the type described in U.S. Pat. No. 4,528,728, having releasable locking means for releasably locking the latch of the snap hook in a closed position, resilient means for normally urging the latch into the closed position and actuating means for moving the latch on the snap hook from the closed position to the opened position, is to be connected to the anchor ring. A lifeline or other safety apparatus is secured to the snap hook. The snap hook is passed between the rollers and as it moves between the rollers the actuating means contact one of the rollers. Since the locking means will not permit movement of the actuating means, the continued movement of the snap hook causes the snap hook to pivot around the one roller means and the other roller moves into contact with release means for releasing the locking means. The continued movement of the snap hook forces the other roller against the release means to move the locking means so that further movement of the snap hook moves the actuating means to move the latch to the opened position. The resilient means forces the lever arms against the snap hook to retain the snap hook in the opened position. The extensible handle is then extended and the opened snap hook is placed into the anchor ring. A force is applied on the extended handle and the remaining portion of the snap hook is moved through the operating means and automatically moves to the closed and locked position. The extensible handle is then retracted. Whenever it is desired to remove a snap hook from the anchor ring or any other type of a relatively fixed object, the operating portion is placed over the snap ring and a force is applied to the operating portion to move it over the snap ring to open the snap ring as described above.

In another preferred embodiment of the invention, the operating portion comprises a support block having a support rod secured thereto. A C-shaped member is secured to the support block. Contacting means are mounted in the C-shape member and comprise a pivotally mounted contact block on each side of the opening in the C-shaped member. The contact blocks are resiliently urged toward each other by resilient springs. Stop means limit the movement of the contact blocks toward each other. This embodiment functions in a manner similar to that described above to position or remove a snap hook on an anchor ring from a remote location.

When it is desired to remove the anchor strap from the I-beam or other fixed support, the handle portion is extended and the operating tool is used in an alternating manner to pull down on the closed loop and push up on the relatively rigid one end portion until it is possible to separate the relatively rigid one end portion form the closed loop so that the relatively rigid one end portion is on one side of the I-beam and the closed loop is on the other side of the I-beam. The operating tool is then passed through the closed loop and releasable retaining means on the operating tool are moved over a portion of the relatively flexible intermediate portion. If there is enough room above the I-beam, the anchor strap is moved upwardly and then over the I-beam so that the extendible handle can be retracted the portion of the relatively flexible intermediate portion removed from the releasable retaining means. If there is not enough room above the I-beam, the operating tool is pulled downwardly to move the remaining portion of the relatively flexible intermediate portion and the relatively rigid one end portion over the I-beam. The extensible handle is retracted and the anchor strap is the removed as described above.

BRIEF DESCRIPTION OF THE DRAWING

An illustrative and presently preferred embodiment of the invention is shown in the accompanying drawings in which:

FIG. 10 is a front elevational view of another operating portion of the apparatus of this invention;

FIG. 11 is a side elevational view from the right side of FIG. 10;

FIG. 12 is a top plan view of FIG. 10;

FIG. 13 is a bottom plan view of FIG. 10;

DETAILED DESCRIPTION OF THE INVENTION

Figure 1:
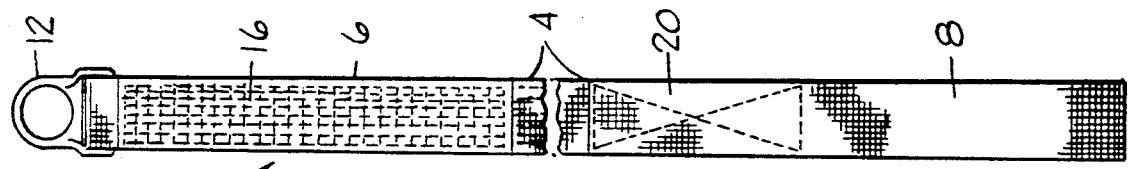
FIG. 1 is a front elevational view of an anchor strap of the invention.
Figure 2:
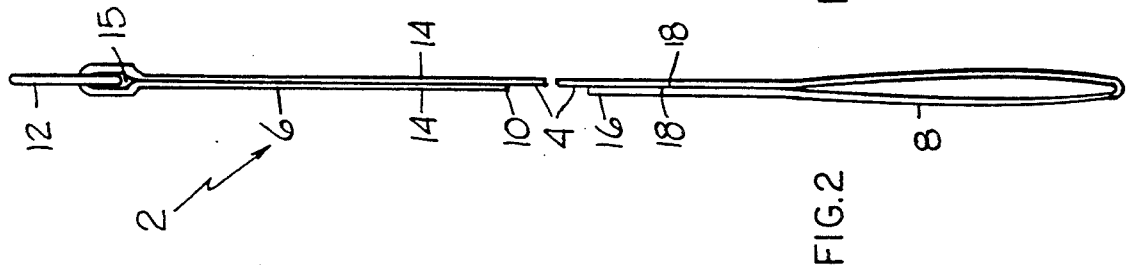
FIG. 2 is a side elevational view of FIG. 1.
Figure 3:
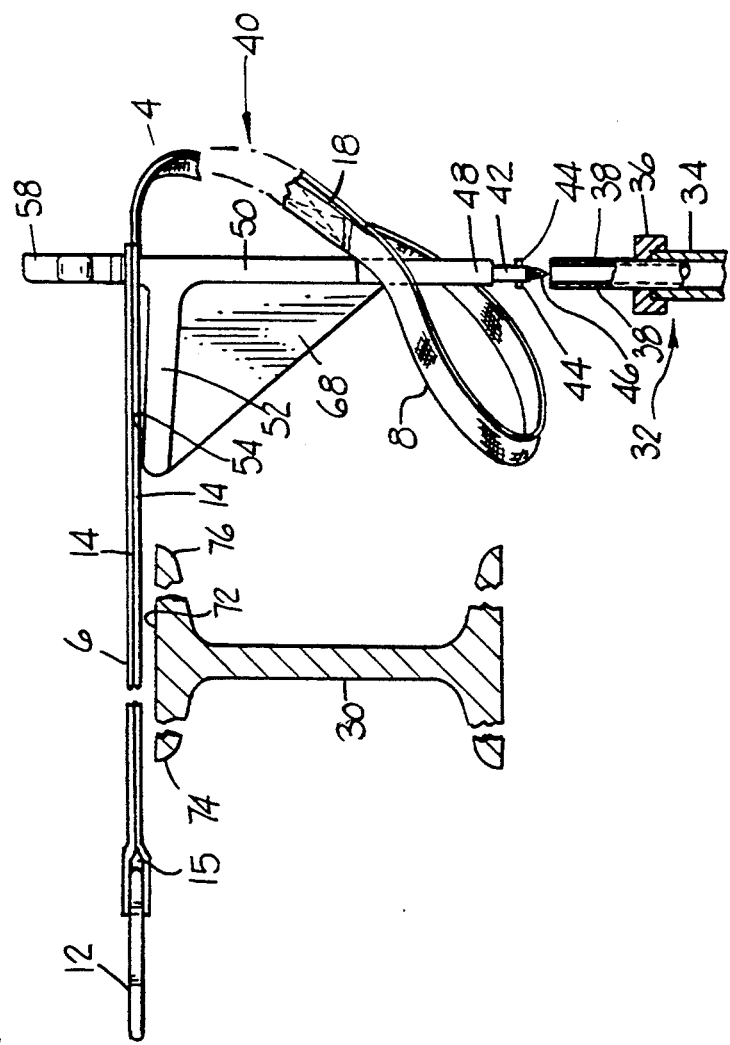
FIG. 3 is a side elevational view with parts in section illustrating a first use of an operating portion of the apparatus of this invention and anchor strap of this invention.

In FIGS. 1 and 2, there is illustrated an anchor strap 2 of this invention. The anchor strap 2 has a relatively flexible intermediate portion 4, a relatively rigid one end portion 6 which is self-supporting when mounted in cantilever fashion and a closed loop 8 as the other end portion. The anchor strap 2 is formed from a continuous strip of a relatively flexible webbing material, formed from nylon, polyester or other similar materials, having a length of about 84 inches, a width of about 3 inches and a thickness of about 0.1875 inch. It is understood that these dimensions may be varied in accordance with the desired strength and intended use of the anchor strap 2. As illustrated in FIG. 2, the relatively rigid one end portion is formed by passing one end portion 10 of the webbing material through an anchor ring 12 and superposing two plies 14 of the webbing material so that a portion of the anchor ring 12 is located in an eye portion 15. The two plies 14 are secured together by intersecting parallel rows 16 of stitching which preferably comprises eight stitches per inch with the parallel rows being spaced apart a distance of about one-half inch. The anchor ring 12 is mounted in the eye portion 15 so that it is self-supporting as illustrated in FIG. 3. The closed loop 8 is formed by folding back the other end portion 16 and stitching together at least portions 18 of the superposed portions by stitching 20. The superposed plies 14 have a length of about 20 inches and width of about 3 inches, the superposed portions 18 have a length of about 6 inches and the closed loop has a total length of about 20 inches.

Figure 4:
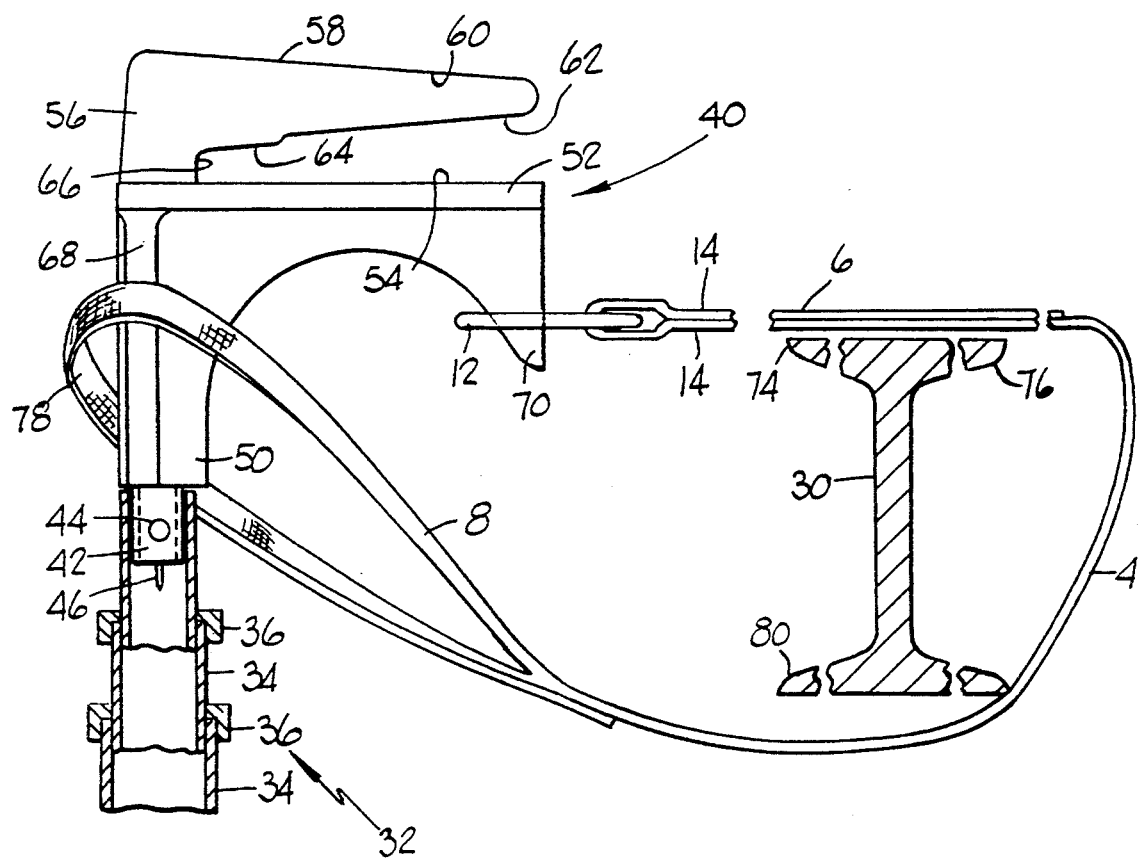
FIG. 4 is a front elevational view with parts in section illustrating a second use of an operating portion of apparatus of this invention and an anchor strap of this invention.
Figure 5:
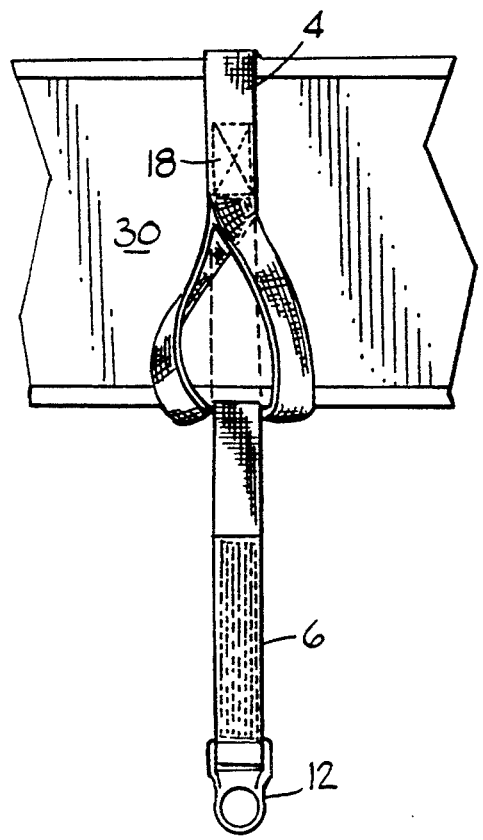
FIG. 5 is a front elevational view of the anchor strap of this invention secured to an I-beam.

In FIGS. 3–5, there is illustrated the use of apparatus of this invention in securing an anchor strap 2 on a fixed support 30, such as an I-beam in a building, where the fixed support 30 is located at a distance of between about 10 and 25 feet from a fixed surface such as the floor of the building or the surface of a cab on a cherrypicker. The distance is essentially limited by the extended distance of an extensible handle, described below. The apparatus comprises a handle 32 having a plurality of extensible portions 34 with releasable locking means 36 for holding an associated extensible portion 34 in an extended position. The first extensible portion 34 has a pair of opposite openings 38 for purposes described below.

A first operating portion 40 of the apparatus has a hollow tubular portion 42 which is dimensioned to fit snugly in the first extensible portion 34. The hollow tubular portion 42 has a pair of opposite buttons 44 which are urged outwardly through opposite openings (not shown) by a resilient spring 46. Securing means 48 secure the hollow tube 42 in a vertically extending support member 50. When it is desired to attach the first operating portion 40 to the first extensible portion 34, the buttons 44 are depressed and the hollow tubular portion 42 is inserted into the first extensible portion 34 until the buttons 44 pop out through the openings 38. When it is desired to separate the first operating portion 40 from the first extensible portion 34, the buttons 44 are depressed and the hollow tubular portion 42 is pulled out of the first extensible portion 34. Thus, the buttons 44, resilient spring 46 and the openings 38 form quick connect-disconnect means.

The vertically extending support member 50 has a flange portion 52 having a support surface 54 which is inclined upwardly at an angle of between about four and six degrees. A plate member 56 projects upwardly from the flange portion 52 and an extension member 58 thereof overlies and is spaced from a portion of the flange portion 52. The extension member 58 has a downwardly inclined upper surface 60. The lower surface of the extension member has a first portion 62 which is inclined downwardly toward the support surface 54 and a second portion 64 which is also inclined downwardly toward the support surface 54. The first and second portions 62 and 64 thus form an open-ended slot that terminates at the end wall 66. The distance between the support surface 54 and the portion of the second portion 64 adjacent to the end wall 66 is less than the thickness of the relatively rigid one end portion 6 so that at least a portion of the relatively rigid one end portion 6 may be wedged between the support surface 54 and the second portion 64 to hold the relatively rigid one end portion 6 in a cantilever fashion as illustrated in FIG. 3. A reinforcing gusset 68 extends between the support member 50 and the flange portion 52. A hook portion 70 extends downwardly from the flange portion 52 and is dimensioned so that it may be passed through the anchor ring 12 as illustrated in FIG. 4.

The operation of the apparatus is illustrated in FIGS. 3–5. With the handle 32 in a non-extended position, the first operating portion 40 is passed through the closed loop 8 and a portion of the relatively rigid one end portion 6 is wedged between the support surface 54 and a portion of the second portion 64. The extendible portions 34 are extended until the relatively rigid one end portion 6 is at a height above the upper surface 72 of the fixed support 30. During the extension of the extendible portions 34, each extendible portion 34 is locked when it has been fully extended. The relatively rigid one end portion 6 is then passed over the upper surface 72 until the anchor ring 12 is spaced from one edge 74 of the relatively fixed support 30, and the relatively flexible intermediate portion 4 is spaced from the other edge 76 of the relatively fixed support 30. A portion of the relatively rigid one end portion 6 is then forced against the upper surface 72 to move the portion of the relatively rigid one end portion 6 out of contact with the portions of the support surface 54 and the second portion 64 so that the relatively rigid one end portion 6 is now supported on the upper surface 72 of the relatively fixed support 30. The first operating portion 40 together with the closed loop 8 and the relatively flexible intermediate portion 4 are then passed under the relatively fixed support 30 and the hook portion 70 is passed through the anchor ring 12 as illustrated in FIG. 4. A downwardly directed force is applied to the handle 32 to pull the anchor ring 12 and the first operating portion 40 through the closed loop 8. The downward movement of the anchor ring 12 is continued until the middle portion 78 of the closed loop 8 and a portion of the relatively flexible intermediate portion 4 are adjacent to the lower edge portion 80 of the relatively fixed support 30. When this occurs, the hook portion 70 is moved out of the anchor ring 12 and the anchor strap 2 so that the anchor strap 2 is secured to the relatively fixed support 30 as illustrated in FIG. 5.

After the anchor strap 2 has been secured on the relatively fixed support 30, it is then desired to attach safety apparatus such as a lifeline, a fall block, a split mount pulley, a DYNALOC self-retracting lifeline or other safety apparatus to the anchor ring 12. Apparatus for attaching such safety apparatus is illustrated in FIGS. 8–16.

Figure 8:
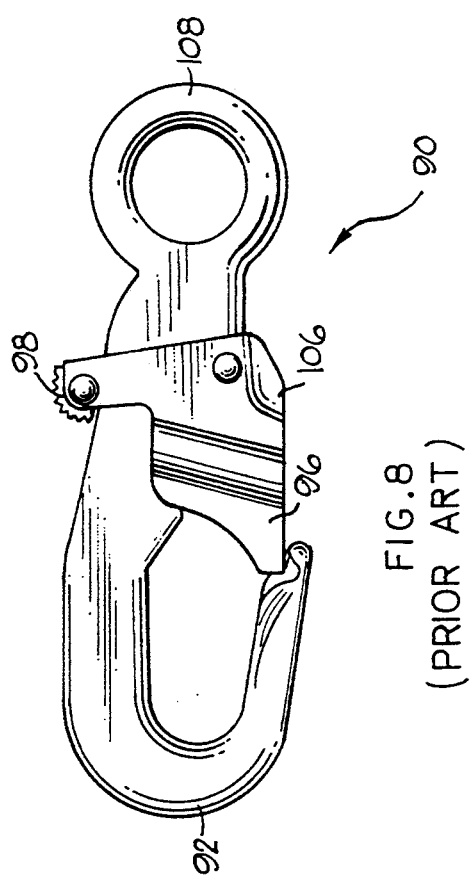
FIG. 8 is a front elevational-view of a snap hook suitable for use with the apparatus of this invention.
Figure 9:
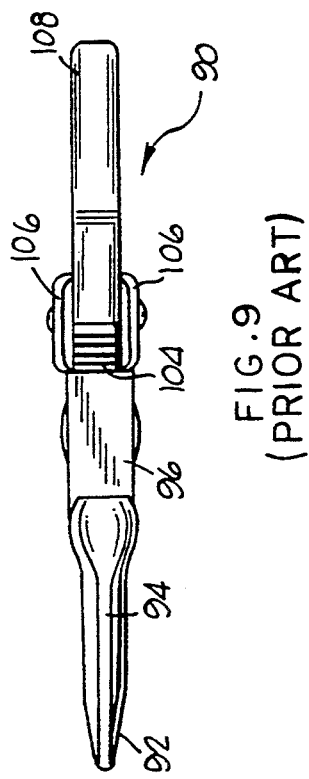
FIG. 9 is a side elevational view of the right side of FIG. 8.

In FIGS. 8 and 9, there is illustrated a snap hook 90 of the type described in U.S. Pat. No. 4,528,728 which is incorporated herein by reference thereto. The snap hook 90 has a hook portion 92 which has an outer relatively narrow surface portion 94, a latch 96 having actuating means 98 for moving the latch 96 from a closed position to an opened position. Resilient means 100, FIGS. 14–16, normally urge the latch 96 to the closed position. Releasable locking means 102, FIGS.

14–16, prevent movement of the actuating means 98 until they are released by actuation of the release means 104 which are located between a pair of outwardly projecting flanges 106. The snap hook 90 has a ring portion 108 so that equipment, such as safety apparatus of the type described above, may be attached thereto.

A second operating portion 120 is illustrated in FIGS. 10–16 and comprises a base portion 122 having a pair of spaced apart recesses 124 formed therein. The base portion 122 has an opening 126 in which the securing means 48 of a quick connect-disconnect means, similar to those illustrated in FIGS. 3 and 4, are secured so that the second operating portion 120 may be attached to the handle 32. The second operation portion 120 has a pair of spaced apart lever arms 128 and 130. One end portion of the lever arm 128 is located in a recess 124 and is secured therein at a fixed location by a pair of spaced apart securing means 132. One end portion of the lever arm 130 is located in a recess 124 and is pivotally mounted therein on the pivot means 134. Each of the lever arms 128 and 130 has a stud 136 projecting outwardly therefrom. Resilient spring means 138 are mounted on the studs 136 by headed threaded bolts 140 and the resilient spring means 138 function to urge the lever arm 130 toward the lever arm 128. The other end portion of the lever arm 128 has a recess 142 formed therein. Contacting means for contacting portions of the snap hook 90 are mounted in the recess 142 and comprises a roller 144 rotatably mounted in the lever arm 128. The lever arm 130 has a recess 146 formed therein and has a roller 148, similar to the roller 144, mounted in the lever arm 130. Each of the rollers 144 and 148 has a central body portion 150 having an outer surface comprising a radially inwardly extending arcuate surface, reduced diameter portions 154 axially spaced from the central body portion and having generally conical outer surfaces with the portion having the smaller diameter located adjacent the portions of the lever arms 128 and 130 defining the recesses 142 and 146 and a generally cylindrical outer surface 156 located between the central body portion 150 and each of the reduced diameter portions 154. The generally cylindrical outer surfaces 156 have diameters greater than the central body portion 150 and the reduced diameter portions 154. An adjustable set screw 158 is threadably mounted in the one end portion of the lever arm 130 and functions to limit the movement of the lever arm 130 toward the lever arm 128. While rollers 144 are used in the preferred embodiment of the invention, it is understood that a block made from a material having a low coefficient of friction may be used instead of the rollers.

Figure 14:
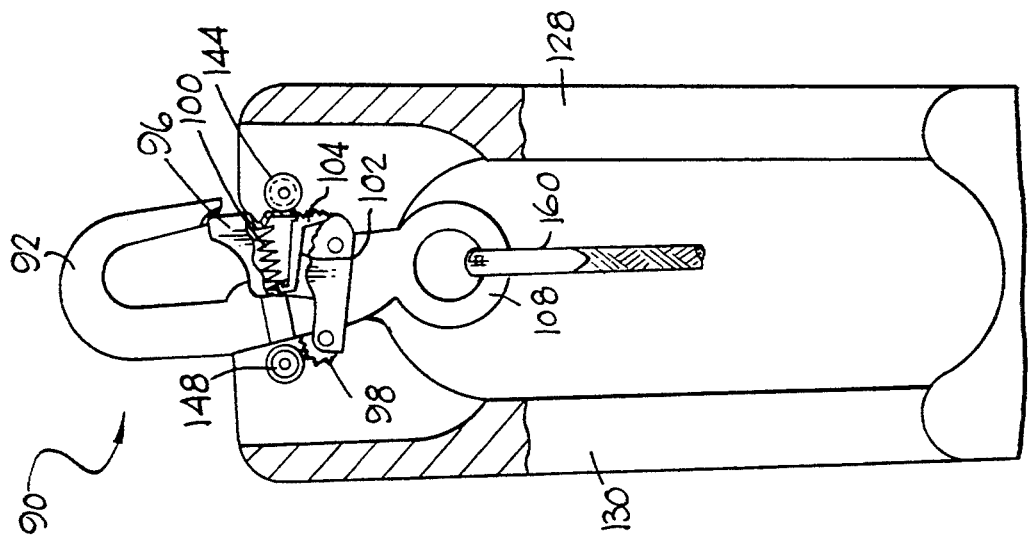
FIG. 14 is a front elevational view, with parts removed, of a portion of FIG. 10 with a snap hook in a position ready to be moved from the closed position to the opened position.
Figure 15:
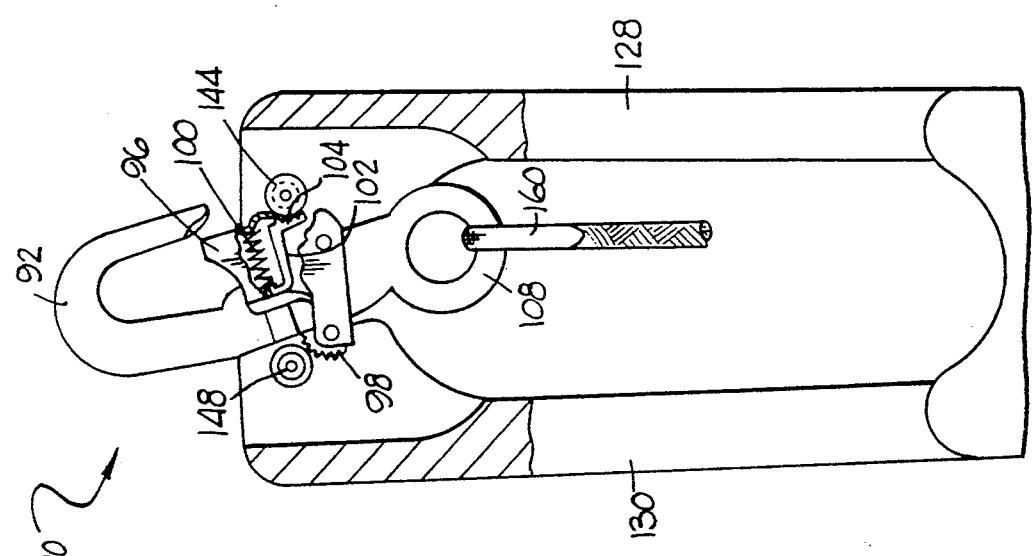
FIG. 15 is a front elevational view, with parts removed, with a snap hook with the release means moved to a location at which the releasable locking means have been released.
Figure 16:
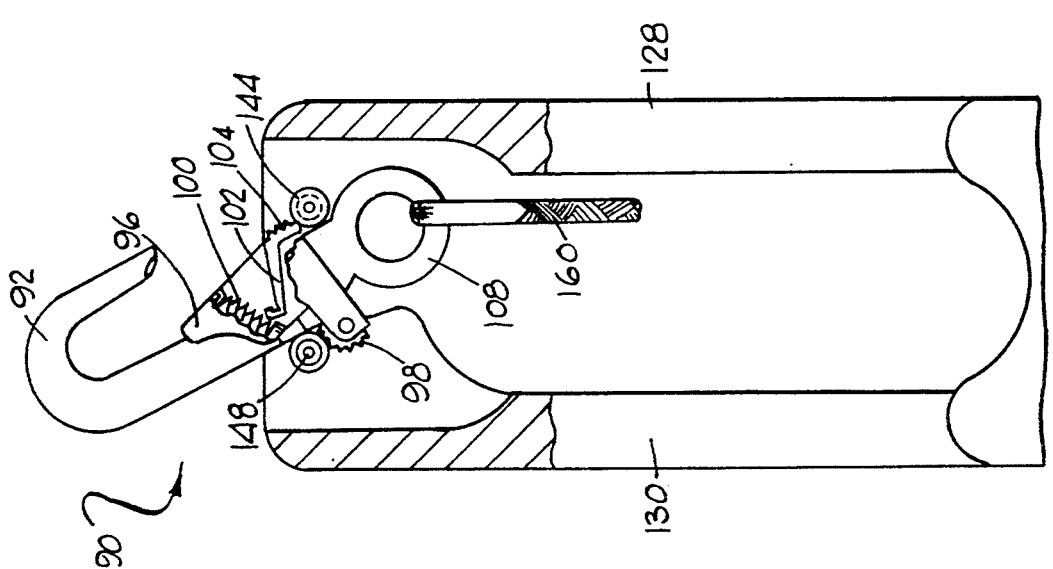
FIG. 16 is a front elevational view, with parts removed, of a portion of FIG. 10 with the snap hook in the opened position.

The operation of the second operating portion 120 is illustrated in FIGS. 14–16. Safety apparatus, such as a lifeline 160, is connected to the ring portion 108. A snap hook 90 is inserted between the rollers 144 and 148 so that the outer surface portion 94 is in contact with the central body portions 150 and a force is applied to the snap hook 90 to move it over the rollers 144 and 148. As illustrated in FIG. 14, the snap hook 90 has been moved so that the roller 148 is in contact with the actuating means 98 and the roller 144 is opposite to the release means 104. The movement of the snap hook 90 moves the lever arm 130 in a direction away from the lever arm 128. Since the locking means 102 prevents movement of the actuating means 98, further movement of the snap hook 90 causes it to pivot around the roller 148 and to move the generally cylindrical portions 156 into contact with the release means 104. The movement of the generally cylindrical portions 156 toward the release means 104 is guided by contact of the flanges 106 with the reduced diameter portions 154. As illustrated in FIG. 15, continued movement of the snap hook 90 causes the generally cylindrical portions 156 to depress the release means 104 to release the releasable locking means 102. As illustrated in FIG. 16, continued movement of the snap hook 90 causes the roller 148 to move the actuating means 98 to move the latch 96 to the opened position. The resilient spring means 138 functions to hold the snap hook 90 in the position as illustrated in FIG. 16. The second operating portion 120 is then connected to the handle 32. The extensible portions 34 are extended until the opened snap hook 90 is in position to be placed in the anchor ring 12 of FIG. 5. A downward force is then applied on the snap hook 90 to move it over and out of contact with the rollers 144 and 148. As the snap hook 90 moves out of contact with the rollers 144 and 148, the resilient means 100 moves the latch 96 to a closed and locked position. The extensible portions 34 are then retracted.

When it is desired to remove the snap hook 90 from the anchor ring 12, the second operation portion 120 is attached to the handle 32 and the extensible portions 34 are extended until the rollers 144 and 148 are located above the snap hook 90. The second operating portion 120 is moved downwardly until the rollers 144 and 148 contact the outer surface portion 94. The downward movement of the second operating portion is continued until the snap hook 90 is in a position similar to that illustrated in FIG. 16. The snap hook 90 is then moved out of the anchor ring 12 and the extensible portions are retracted. The snap hook 90 is then pulled out of its location between the rollers 144 and 148 and the resilient means 100 moves the latch 96 to the closed and locked position. In some instances, it may be desired to remove a strap hook from a location which is below and removed from a fixed surface. The operation of the second operating portion 120 is the same as described above except that an upwardly directed movement is applied to the second operating portion 120 instead of the downwardly directed movement.

Figure 18:
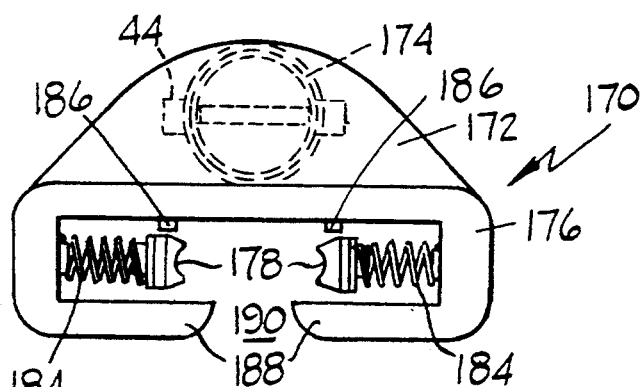
FIG. 18 is a top plan view of FIG. 17.
Figure 19:
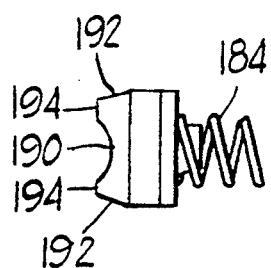
FIG. 19 is an enlarged view of a portion of FIG. 18.
Figure 17:
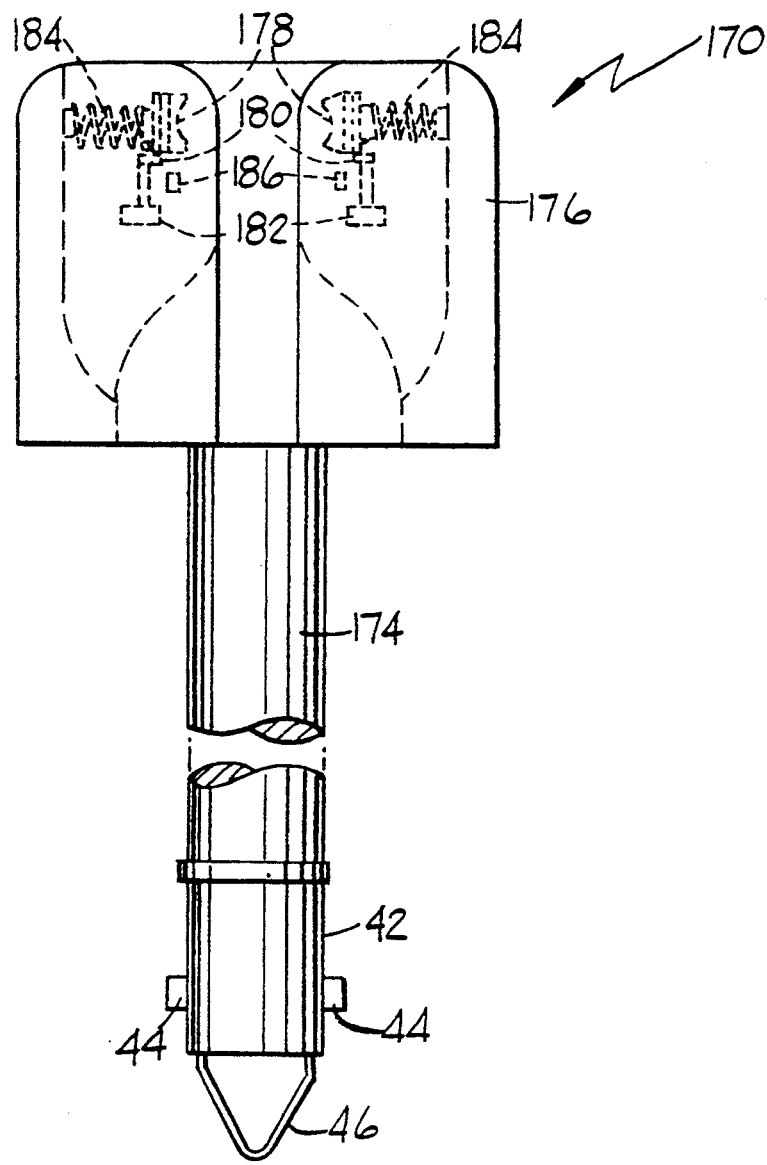
FIG. 17 is a front elevational view of another operating portion of this invention.

A third operating portion 170 is illustrated in FIGS. 17 and 18 and comprises a housing 172 having a support rod 174 secured thereto by suitable means, such as by welding. Quick disconnect means, similar to those in FIGS. 10 and 11, are mounted in the bottom of the support rod 174. A C-shaped portion 176 is formed in the housing 172. Contacting means are mounted in the C-shaped portion 176 and comprise a pair of spaced apart contact blocks 178, each of which has a stem portion 180 connected to pivot means 182. As illustrated in FIG. 19, each contact block has a surface configuration similar to that of the rollers 144 and 148 comprising a central body portion 190 having an inwardly extending arcuate surface, sloping portions 192 and projecting portions 194. It is understood that one of the contact blocks 178 can be mounted at a fixed location. Resilient spring means 184 urge the contact blocks 178 toward each other. The resilient spring means may also be a leaf spring or an elastomer spring. Stop means 186 limit the movement of the contact blocks 178 toward each other. If desired, the contact block 178 can be mounted for linear sliding movement. The end portions 188 of the C-shaped portion 176 are spaced apart so as to form a passageway 190 therebetween so that safety equipment, such as a lifeline, may pass therethrough. The third operating portion 170 operates in a manner similar to the second operating portion 120 of FIGS. 10 and 11.

Figure 20:
FIG. 20 is a front elevational view of another preferred embodiment of an anchor strap of the invention.
Figure 21:
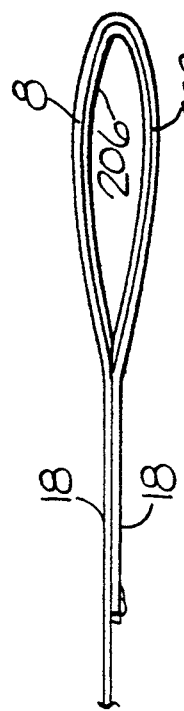
FIG. 21 is a side elevational view of the closed loop portion of FIG. 20.
Figure 22:
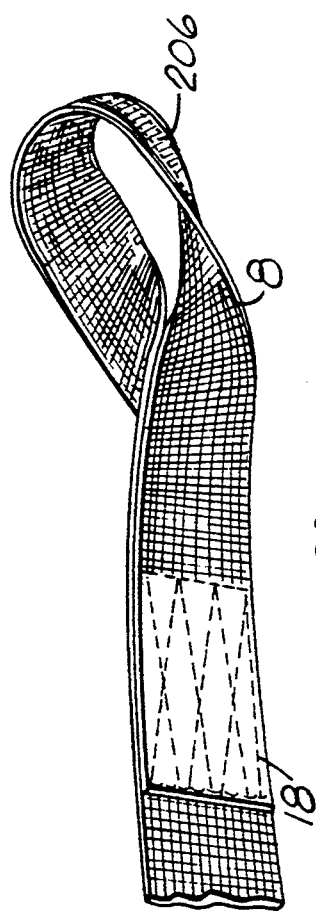
FIG. 22 is a perspective view of the closed loop portion after a portion thereof has been turned inside out.
Figure 23:
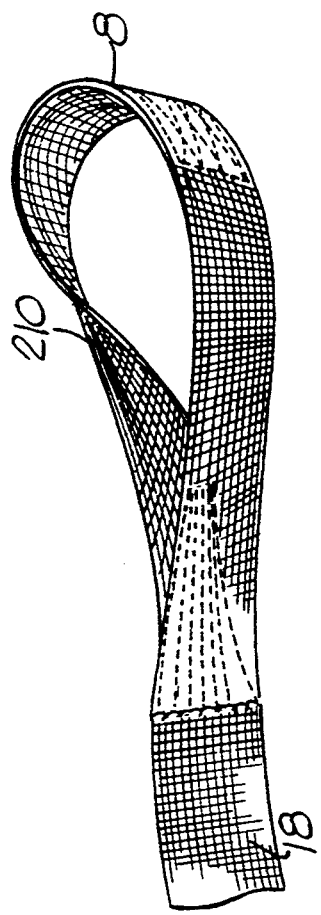
FIG. 23 is a perspective view of another preferred embodiment of the closed loop portion.

In FIGS. 20–22, there is illustrated another preferred embodiment of an anchor strap 2 of this invention. The portions of the anchor strap 2 in FIGS. 20–22 which are similar to the portions of the anchor strap 2 in FIGS. 1 and 2 have been identified with the same reference numerals. A portion 202 of the relatively flexible intermediate portion 4 is provided with stitching 204 to impart some rigidity thereto for purposes described below. The stitching 204 extends for a length of about 6 inches. The dimensions of the anchor strap 2 in FIGS. 20–22 are the same as those described above for the anchor strap 2 of FIGS. 1 and 2. A reinforcing member 206 is secured to a portion of the inner surface 208 of the closed loop 8 so that when a portion of the closed loop is turned inside out, as illustrated in FIG. 22, the reinforcing member 206 will function to hold the closed loop 8 in an open configuration. In FIG. 23, the closed loop 8 is twisted before the portions 18 are secured together to provide a twist 210 to hold the closed loop in an open configuration.

After the operations for which the anchor strap 2 was secured to the I-beam 30 have been completed, it is desirable to remove the anchor strap 2 from the I-beam 30. The handle 32 is extended and the hook 70 is positioned on a portion of the closed loop and a downwardly directed force is applied thereto. The flange portion 52 is then placed against the anchor ring 12 and an upwardly directed force is applied thereto. The applications of the downwardly and upwardly directed forces are alternatively repeated until it is possible to separate the relatively rigid one end portion 6 and the closed loop 8 so that the relatively rigid one end portion 6 is on one side of the I-beam 30 and the closed loop 8 is on the other side of the I-beam 30.

Figure 7:
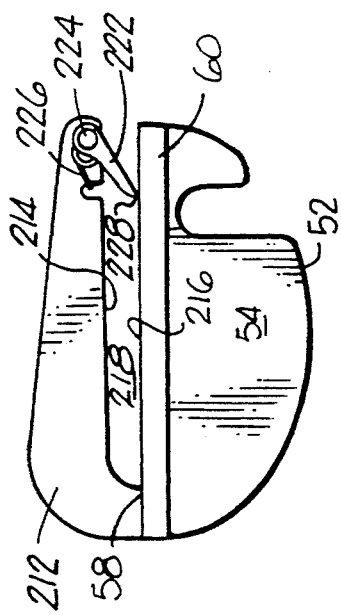
FIG. 7 is a top plan view of FIG. 6.
Figure 6:
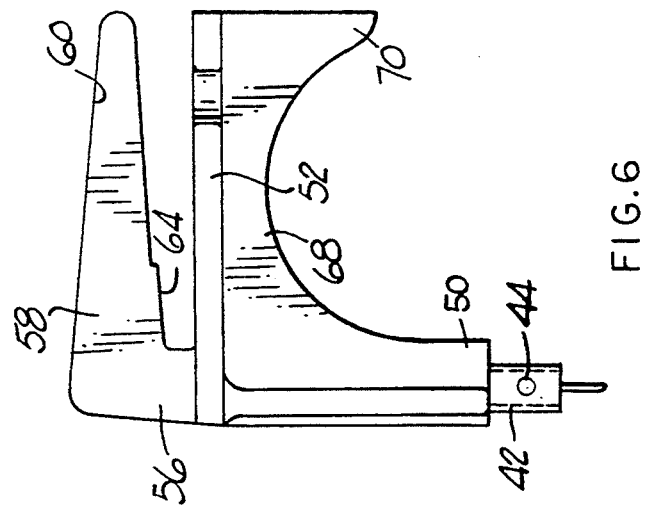
FIG. 6 is a front elevational view of an operating portion of apparatus of this invention.

As illustrated in FIG. 7, the operating portion 40 is provided with a releasable retaining portion comprising an L-shaped arm 212, integral with a portion of the reinforcing gusset 68, and having a surface 214 spaced from the surface 216 of the reinforcing gusset 68 to provide a space 218 having a width sufficient to accommodate a portion 220, FIG. 20, of the relatively flexible intermediate portion 4. A gate 222 is pivotally mounted on the arm 212 by pivot means 224. A spring 226 urges the gate 222 toward the surface 216. The gate 222 has a narrow edge portion 228 so that as the gate 222 is moved against the portion 220, the gate 222 will pivot and the portion 220 will move into the space 218. However, the spring 226 will urge the narrow edge portion 228 against the portion 220 to restrain the movement of the portion 220 out of the space 218.

After the anchor strap 2 has been separated as described above, the operating portion 40 is moved through the closed loop 8 and the gate 222 is moved against the portion 220 and the movement of the gate 222 is continued until the portion 220 has moved into the space 218. If there is sufficient room above the I-beam 30, the operating portion 40 is moved upwardly and the remaining portion of the relatively flexible portion 4, the stitched portion 202 and the relatively rigid one end portion 6 are moved over the I-beam 30 and the handle 32 is retracted. The portion 220 is then removed from the space 218 by moving the gate toward the surface 214 or by diagonal movement of the gate 222 over the portion 220. If there is not sufficient room above the I-beam 30, a downward force is applied to the operating member 40 to pull the remaining portions of the relatively flexible intermediate member 4, the stitched portion 202 and the relatively rigid one end portion 6 over the I-beam 30. The rigidity of the stitched portion 202 is sufficient to prevent any hang-up of the relatively rigid one end portion 6 on the I-bean 30 as it is being pulled over it. The handle 32 is retracted and the portion 220 is moved out of the space 218 as described above. Also, when the anchor strap 2 is being installed on a fixed support, if the relatively rigid one end portion 6 is moved too far over the fixed support and it is necessary to pull it back, the portion 202 has sufficient rigidity to prevent any hang-up of the relatively rigid one end portion and the fixed support.

While an illustrative and presently preferred embodiment of the invention has been described in detail herein, it is to be understood that the inventive concepts may be otherwise variously embodied and employed and that the appended claims are intended to be construed to include such variations except insofar as limited by the prior art.

What is claimed is:

1. Apparatus for connecting or disconnecting a snap hook, which snap hook has resilient means for urging said snap hook to a closed position, releasable locking means for holding said snap hook in said closed position and actuating means for moving said snap hook to an opened position, to or from an anchor ring which is located at a remote distance from a fixed surface comprising: an operating portion;

moving means for moving said operating portion from a nearby location to a remote location;

at least two spaced apart opposed contact means located to contact said snap hook;

mounting means for mounting at least one of said at least two spaced apart contact means for movement toward or away from the other of said at least two spaced apart contact means;

said at least two spaced apart opposed contact means cooperating to unlock said snap hook and to open said snap hook as said snap hook is moved between said at least two spaced apart contact means; and said operating portion having releasable retaining means for releasably retaining said snap hook in said opened position so that said snap hook may be moved to a desired location at which location said releasable retaining means are released and said resilient means moves said snap hook to a closed and locked position.

2. Apparatus as in claim 1 further comprising:

said moving means comprising an extensible handle; and quick connecting or disconnecting means on said handle and said operating portion for connecting said operating portion to said extensible handle or disconnecting said operating portion from said extensible handle.

3. Apparatus as in claim 1 wherein said operating portion comprises:

a base member;

at least a pair of spaced apart lever arms projecting out of said base member;

at least one of said spaced apart lever arms being pivotally mounted on said base member;

resilient means for urging said at least a pair of lever arms toward each other; and said at least two spaced apart opposed contact means mounted on said at least a pair of lever arms for contacting portions of said snap hook as said snap hook is passed between said at least two spaced apart opposed contact means to move said snap hook from a closed position to an opened position.

4. Apparatus as in claim 3 wherein:
each of said at least two spaced apart opposed contact means is rotatably mounted in at least one of said at least a pair of lever arms.

5. Apparatus as in claim 3 wherein each of said at least two spaced apart opposed contact means comprises:
a roller; and
said roller is mounted in a recess portion of each of said at least a pair of lever arms.

6. Apparatus as in claim 5 wherein each of said rollers comprises:
a central body portion having an outer surface comprising a radially inwardly extending arcuate recess;
a reduced diameter portion on each axial side of said central body portion and spaced therefrom and having generally conical outer surfaces; and
a generally cylindrical outer surface between said central body portion and each of said reduced diameter portions.

7. Apparatus as in claim 1 wherein:
said snap hook has release means for releasing said releasable locking means for holding said snap hook in a closed position and actuating means for moving a latch from a closed position to an opened position when said releasable locking means have been released and wherein:
said at least two spaced apart opposed contact means are located so that, when said snap hook is passed between said at least two spaced apart opposed contact means, said actuating means contacts one of said at least two spaced apart opposed contact means and, since said locking means prevents movement of said actuating means, said snap hook pivots around one of said at least two spaced apart opposed contact means so that the release means on said releasable locking means moves into contact with the other of said at least two spaced apart opposed contact means so that continued movement of said snap hook actuates said release means to release said releasable locking means; and
continued movement of said snap hook moves said actuating means to move said latch from said closed position to said opened position.

8. Apparatus as in claim 7 and further comprising:
means for guiding said at least two spaced apart opposed contact means into contact with said release means.

9. Apparatus as in claim 7 and further comprising:
quick connecting or disconnecting means on said handle and said operating portion for connecting said operating portion to said extensible handle or disconnecting said operating portion from said extensible handle.

10. Apparatus as in claim 1 wherein said operating portion comprises:
a hollow housing having a passageway formed therein for movement of said snap hook into or out of said hollow housing;
said at least two spaced apart opposed contact means on each side of said passageway;
at least one of said at least two spaced apart opposed contact means being pivotally mounted on said hollow housing;
additional resilient means for urging said at least one of said at least two spaced apart opposed contact means toward the other of said at least two spaced apart opposed contact means for contacting portions of said snap hook as it is passed between said at least two spaced apart opposed contact means to move said snap hook from a closed position to an opened position.

11. Apparatus as in claim 10 wherein:
each of said at least two spaced apart opposed contact means being pivotally mounted on said hollow housing and resiliently urged toward each other; and
stop means for limiting the movement of said contact means toward each other.

* * * * *